Inventor
EDWARD D. CROSS
by Davis, Hoxie & Faithfull
Att'ys.

Inventor
EDWARD D. CROSS
by Davis, Hoxie & Faithfull
att'ys.

Jan. 26, 1960 E. D. CROSS 2,922,686

RECORDING DEVICE

Filed Feb. 12, 1953 5 Sheets-Sheet 3

Inventor
EDWARD D. CROSS
by Davis, Hoxie & Faithfull
Att'ys.

Jan. 26, 1960 E. D. CROSS 2,922,686

RECORDING DEVICE

Filed Feb. 12, 1953 5 Sheets-Sheet 4

Inventor
Edward D. Cross
by Davis, Hoxie & Faithfull
att'ys.

Jan. 26, 1960

E. D. CROSS 2,922,686

RECORDING DEVICE

Filed Feb. 12, 1953

5 Sheets-Sheet 5

Inventor
EDWARD D. CROSS
by Davis, Hope & Faithfull
att'ys.

United States Patent Office
2,922,686
Patented Jan. 26, 1960

2,922,686

RECORDING DEVICE

Edward D. Cross, Brockton, Mass., assignor to Alden Products Company, Brockton, Mass., a corporation of Massachusetts Application February 12, 1953, Serial No. 336,576

9 Claims. (Cl. 346—23)

The interpretation of data recorded either continuously or intermittently is materially aided by the incorporation in the record of a chronological or other calibration which is preferably made simultaneously with the recording of the data so as to take into account variations in the recording conditions such as paper feed rate and dimensional changes in the recording paper with atmospheric conditions.

It is therefore the principal objects of this invention to provide a recording device which will provide a chronological calibration or other record upon recording paper, which is readily adaptable to existing types of recorders, which makes a particularly clear and distinct record, which does not interfere with operation of the recorder, which is rugged and trouble-free, which is automatic in operation and which advances the art generally.

In the broadest aspect the invention contemplates two relatively movable recording elements located respectively upon either side of a recording paper. One of the elements has a reticulated effective surface against which the paper is brought to bear by the other element which is preferably in the form of an anvil or stylus which forces the paper against the reticulated surface so that the raised portions thereof increase the unit contact pressure to provide a clear and distinct record with a minimum of recording pressure.

In a more specific aspect the recording elements are in the form of an anvil and hammer across which an electrical potential is supplied so that they act as electrodes for causing a current to flow through a web of electrosensitive recording paper. The effective portion of the anvil is provided with raised portions, such as characters forming an appropriate legend, while the effective portions of the hammer are preferably reticulated, wherby relatively moving the hammer toward the anvil brings the recording paper into forcible contact with the raised characters, the raised reticulated portions of the hammer causing a high unit contact pressure resulting in the recording of a clear and distinct image of the indicia upon the paper. By operating the hammer by means of a solenoid which is periodically energized through a cam operated switch, a chronological calibration is recorded upon a moving web of paper.

These and other objects and aspects will be apparent from the following description of a specific embodiment of the invention which refers to drawings wherein.

Figure 1:
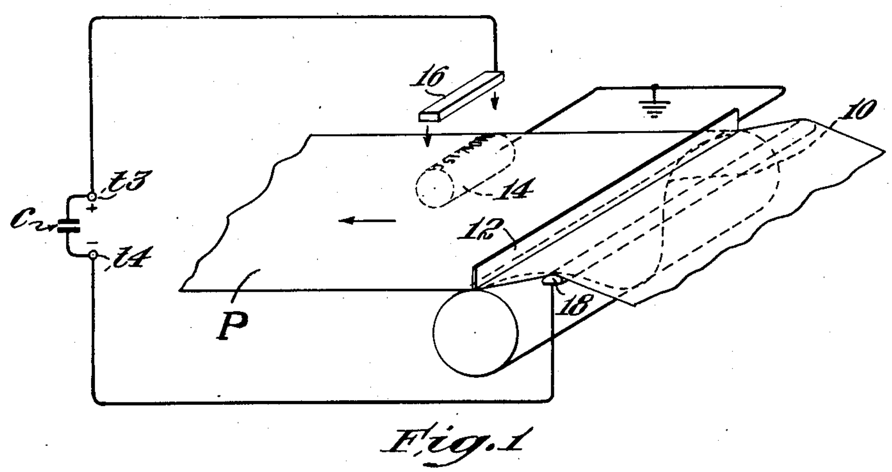
Fig. 1 is a schematic view of the invention.

The embodiment of the invention chosen for the purpose of illustration is particularly adapted to supply chronological calibration signals to a web of electrosensitive paper P (Fig. 1) which is fed by well known feeding means, such as rolls (not shown), between a rotating helical electrode 10 and a correlated blade electrode 12. The above mentioned components being conventional in design and well known to the art need not be described further. The blade electrode 12 is electrically interconnected through ground with an anvil 14 forming one element of the calibrating device. Cooperating with the anvil 14 is a hammer 16 which is connected to the positively charged terminal of a power supply such as the capacitor C. The negative terminal of the capacitor C is directly linked with an auxiliary bar electrode 18 located upon the opposite side of the electrosensitive paper web P from the hammer 16.

Figure 3:
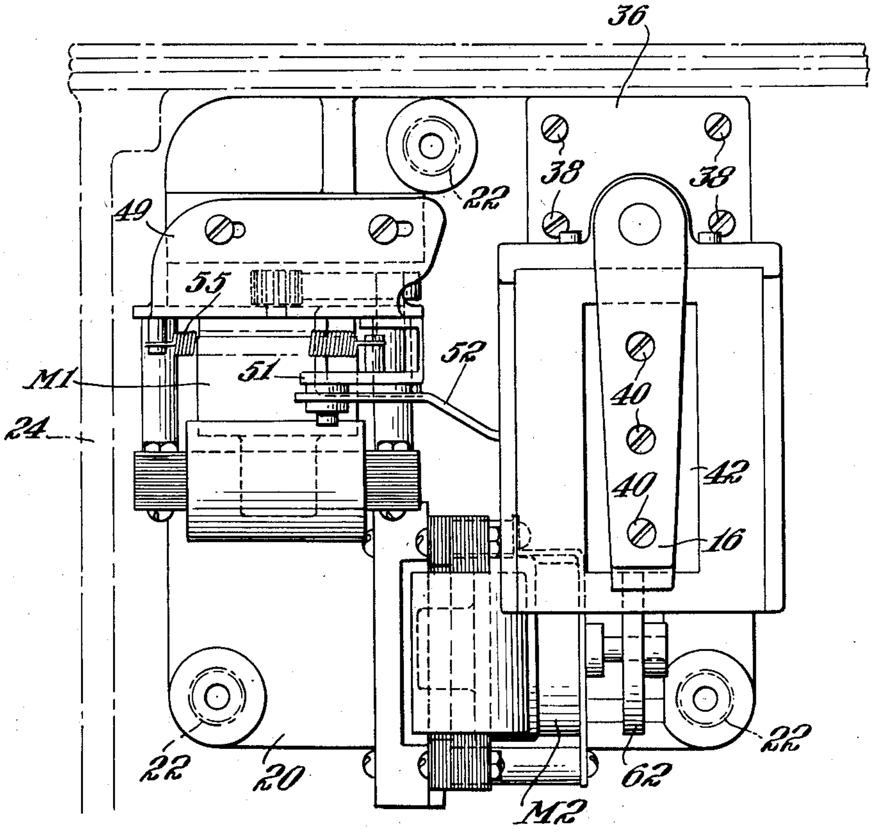
Fig. 3 is a plan view of the hammer and anvil assembly.
Figure 7:
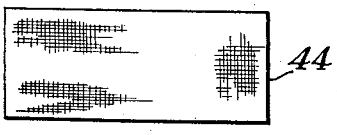
Figure 4:
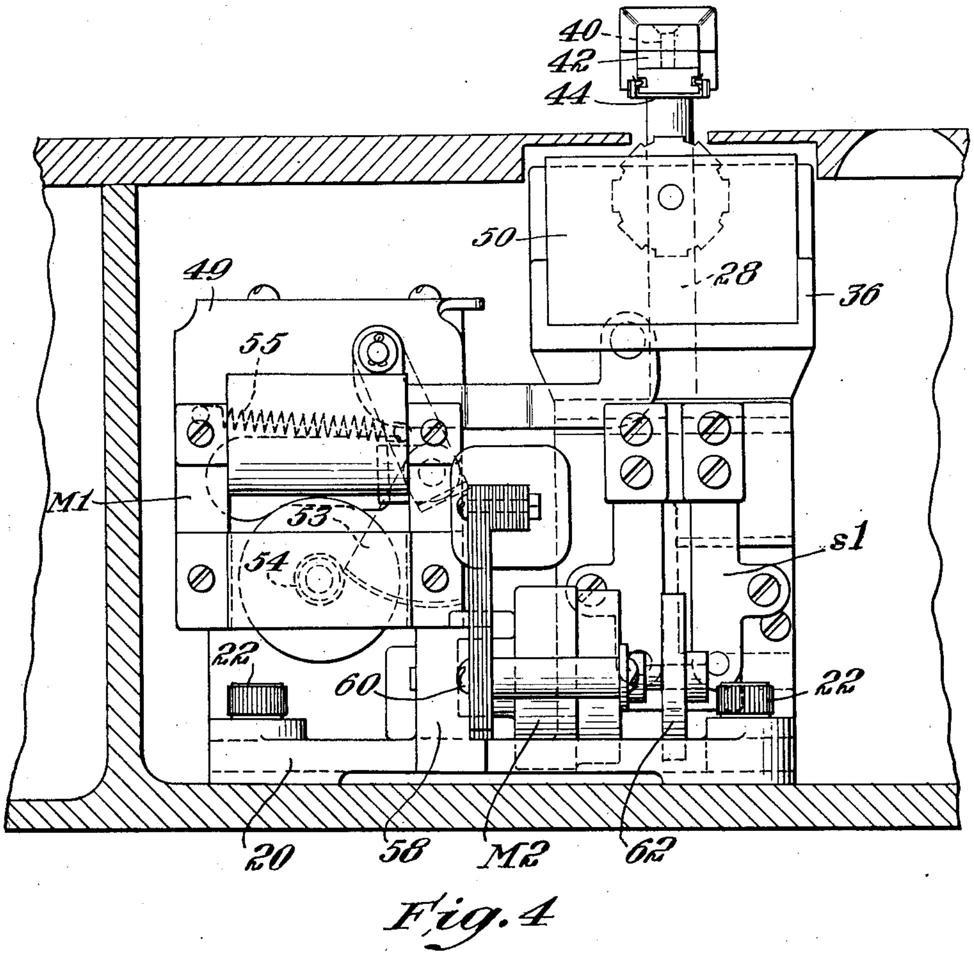
Fig. 4 is a side view of the assembly.
Figure 5:
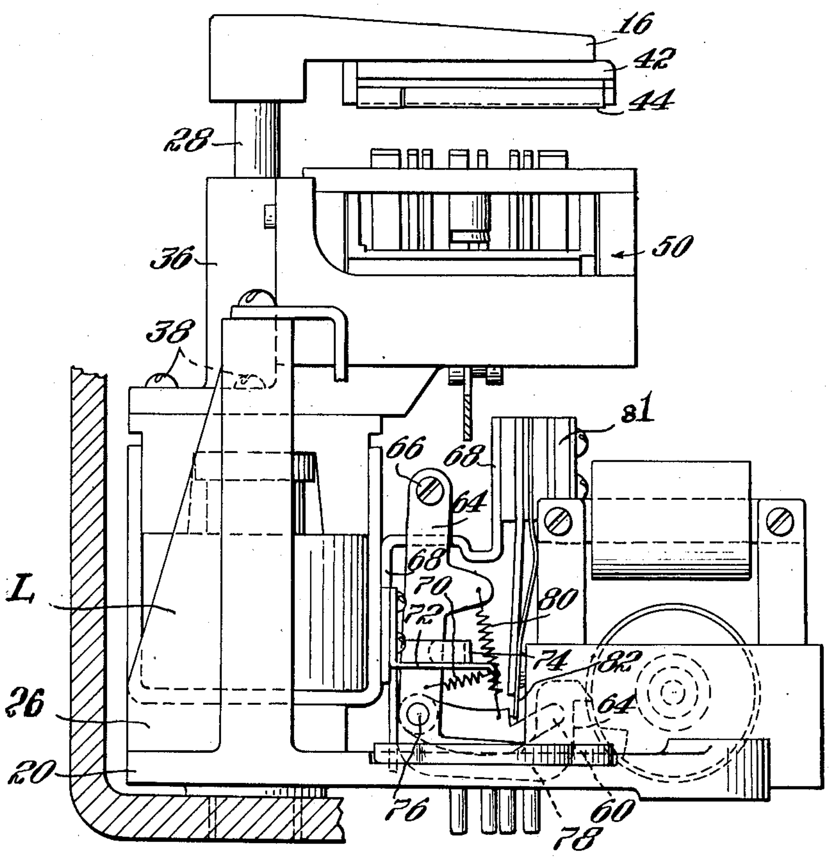
Figs. 5 and 6 are opposite end views thereof.

The anvil 14 and the hammer 16 are preferably combined in a single unit such as shown in Figs. 3 to 5 and described in detail below. This unit comprises a base 20 which is attached by three cap screws 22 to the bottom of the recorder housing 24. Mounted upon two spaced bosses 26 extending upwardly from the base 20 is a hammer actuating solenoid L. The solenoid armature 28 extends completely through the solenoid L, the lower end thereof carrying a bushing 30 which seats against the top of a spring 32. The spring (and armature) extend through an aperture in the base 20 so that the bottom of the spring rests in a cup 34 in the recorder housing 24, the spring being compressed between the bushing 30 and the cup normally to bias the armature upwardly until the bushing rests against the bottom of the frame of the solenoid L.

The opposite end of the armature 28 slides in an aperture in an anvil bracket 36 which is secured to the top of the solenoid frame by four screws 38. The tip of the armature 28 which extends beyond the anvil bracket 36 has pinned thereto the hammer 16. Attached to the underside of the hammer 16 by three screws 40 is a head 42 having a slot on either side for receiving the rolled-over edges of a reticulated member such as the screen 44 which forms the effective portion of the hammer.

Secured in a slot in the anvil bracket 36 by screws 46, 47 and 48 is a time stamp assembly 50 which is provided with a plurality of axially arranged wheels upon whose outer periphery are raised characters representing appropriate units of time, although it is to be understood that the invention is not limited thereto, but any appropriate legend may be used. The wheels are mechanically interconnected, for example by gears (not shown), so that the wheels are rotated at proportionate speeds by means of a drive described below whereby the raised characters are changed chronologically. To this end the actuating arm for the wheels is connected by means of a linkage described below with a motor M1 which is mounted on the base 20 by means of a bracket 49 whereby each revolution of the motor causes a reciprocating movement of the actuator to advance periodically the character bearing wheels intermittently.

The linkage for imparting such intermittent movement includes a link 52 one end of which is pivotally connected with the actuating arm for the time stamp assembly 50. The other end of the link 52 is pivotally connected with a crank arm 51 whose shaft is journalled in the bracket. The opposite end of the crank arm shaft has attached thereto a gear sector 53 which engages the teeth of a pinion 54 upon the shaft of the motor M1 so that as the motor shaft is rotated the link 52 is moved against the biasing force exerted by a spring 55 to trip the time stamp mechanism. Several adjacent teeth are omitted from the motor pinion 54 so that after the time stamp mechanism is tripped as described above, the gear sector 53 is released whereupon the linkage is returned to its original position by the spring 55 and the cycle repeated.

Figure 6:
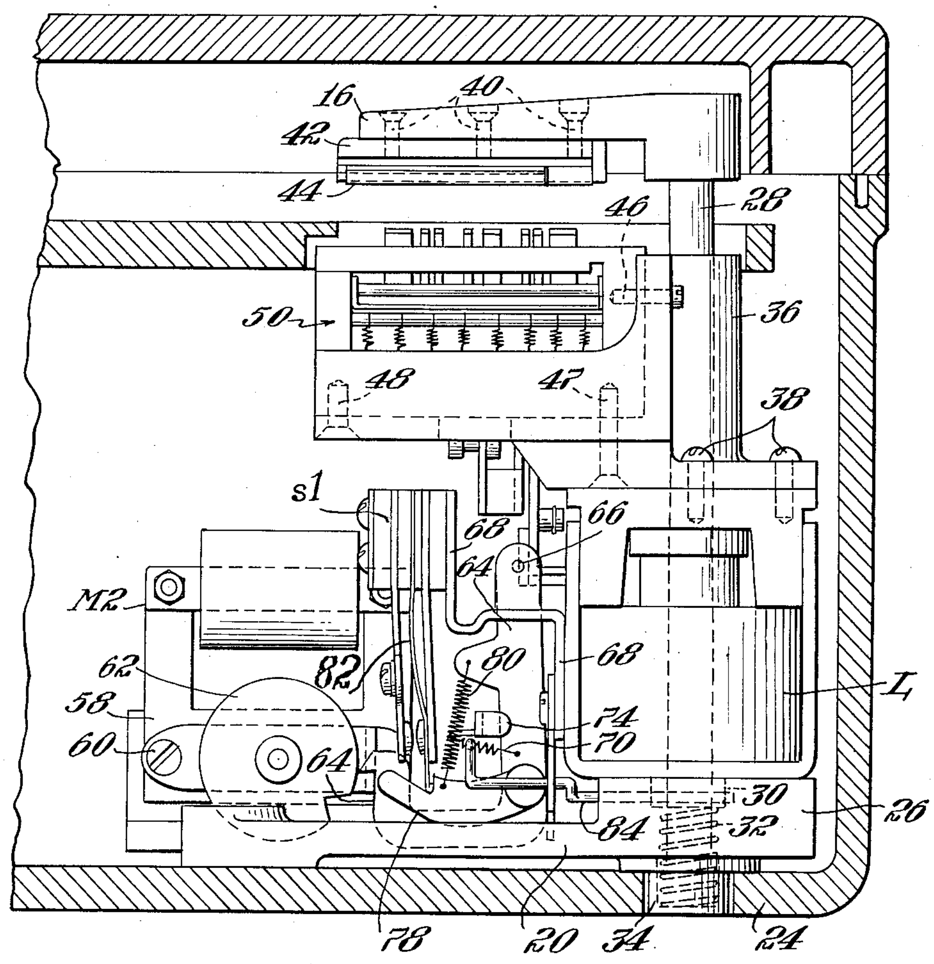

A second motor M2 is attached by screws 60 to the side of a boss 58 which projects upwardly from the base 20. The shaft of the motor M2 has attached thereto a cam 62 whose periphery is in contact with the end of a cam follower 64 which is bent and pivotally mounted as at 66 (Fig. 5) upon a bracket 68 secured to the frame of the solenoid L. The follower 64 is biased so that the end thereof remains in contact with the periphery of the cam 62 by means of a spring 70 one end of which is secured in a small aperture in the vertical portion of the follower. The other end of the spring 70 is fastened to the end of a hanger 72 which extends outwardly from the bracket 68. Travel of the follower 64 towards the cam 62 is limited by an extension 74 from the bracket the outermost end of which is bent around the vertical portion of the follower. Pivotally attached to the cam follower 64, as at 76, is a notched finger 78 which is biased upwardly by a spring 80 that extends between the finger and a projection at an intermediate point on the vertical portion of the cam follower 64 so that the notch in the upper edge of the finger engages a resilient bridging contact 82 of a switch *s1*. As is shown in Figs. 4 and 6, the switch *s1* has two pair of stationary contacts, the outermost pair of which are open with the resilient bridging contact 82 in the normal position of the switch. When the end of the follower 64 is riding upon the raised portion of the cam 62, the follower and attached finger 78 are forced away from the cam and the lower edge of the bridging contact 82 which is caught in the finger notch remains in its normal position separated from the outermost pair of stationary contacts.

When the follower 64 drops into the notch in the cam 62, the spring 70, the follower 64 and the finger 78 move forward so that the bridging contact 82 is forced outwardly to make with the outermost pair of stationary contacts which, as will be described in detail hereinafter, connect the hammer solenoid L with a power supply pulling the armature 28 downwardly against the force exerted by the spring 32. The movement of the armature 28 is transmitted to the finger 78 by means of a stiff wire or rod such as the trigger 84 one of whose ends is pressed through aligned apertures in the armature and the bushing 30. The configuration of the trigger 84 is such that its opposite end is disposed over the top edge of the finger 78 so that as the armature 28 moves downwardly the bridging contact 82 of the switch *s1* is released from the notch in the finger 78 thus returning the contact to its normal position separated from the stationary contacts of the switch. This action interrupts the energizing circuit of the solenoid immediately after the blow has been struck by the hammer 16 without the necessity of waiting for the cam 62 to revolve and lift the follower 64 out of the cam notch. When the follower 64 and the attached finger 78 have been moved far enough back by the above mentioned rotation of the cam 62, the switch bridging contact 82 snaps back into the notch in the finger, resetting the mechanism for the next operation thereof.

Figure 2:
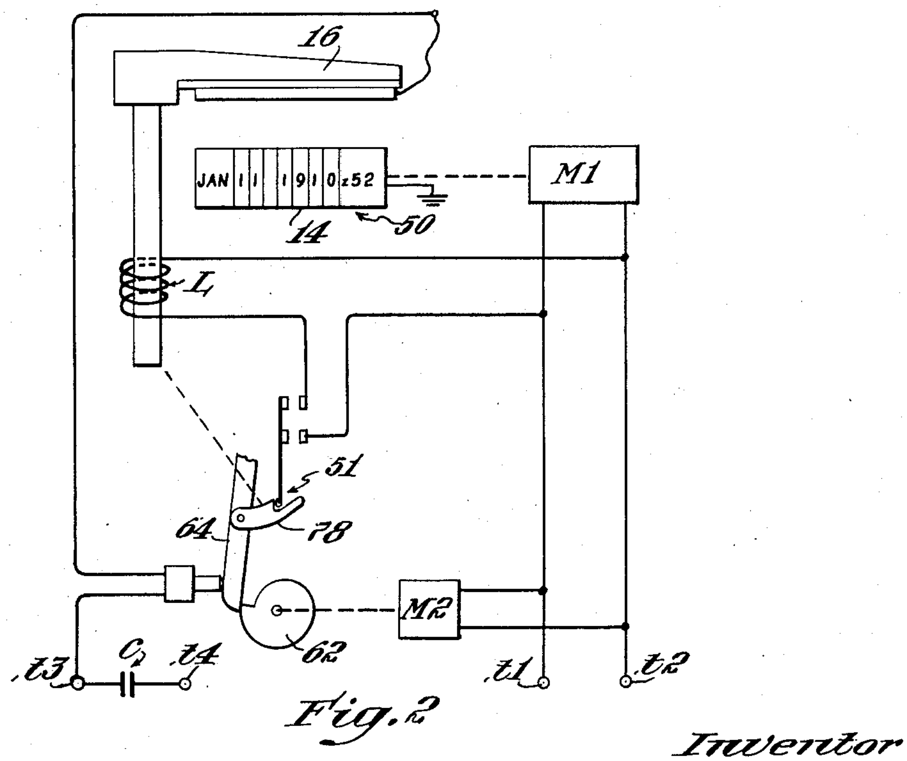
Fig. 2 is a wiring diagram.

The wiring diagram for the above described apparatus is shown in Fig. 2 where *t1* and *t2* are the terminals of a conventional alternating power supply (not shown) which energizes the synchronous timing motors M1 and M2. The hammer solenoid L is also energized from this power supply by the closing of the contacts of the switch *s1* as has been described heretofore. The terminals *t3* and *t4* of a direct power supply which includes the capacitor C are connected in series with the time stamp 50, the recorder electrodes 10 and 12 and the bar electrode 18 so that the closing of the switch contacts completes a circuit therethrough.

With the terminals *t1* and *t2* energized and the capacitor C in charged condition, the above described apparatus operates as follows: The motor M1 periodically trips the timing mechanism 50 so that the wheels having the raised characters thereupon are intermittently rotated to indicate time in hours and minutes upon a twenty-four hour basis, the month, day and the last two numbers of the year. The motor M2 rotates the cam 62 at a rate which is correlated with the rate of feed of the paper P; for example, a one-revolution per hour motor will rotate the cam 62 to energize the solenoid L thereby bringing the hammer 16 down towards the anvil 14 once every hour which compresses the paper P between the raised wheel characters and the hammer screen 44 to imprint a calibration upon the paper as described in detail hereinafter. If more frequent calibrations are desired as, for example, in a recorder having a more rapid rate of paper feed, a higher speed motor is substituted for the motor M2 to energize the solenoid L more frequently.

The capacitor C discharges through a circuit including the hammer 16, the paper P, the anvil 14, the blade electrode 12, the paper P and the auxiliary bar electrode 18 while the paper web is compressed between the anvil and hammer as described above. The capacitor C is connected with a polarity such that the current flows through the above circuit in the conventional direction so that the image of the anvil wheel characters are electrolytically printed upon the upper surface of the paper web P in the well known manner, and in a similar manner a fiducial line which correlates the effective position of the marking electrodes 10 and 12 with calibration characters is printed simultaneously on the upper surface of the paper web below the blade electrode 12.

It has been found that the use of the screen 44 materially aids in the delineation of the wheel characters giving a clear outline with considerably less bleeding and blurring of the outline. It is believed that this improvement in the record is due to the increased pressure per unit area which reduces the electrical resistance and permits a greater current density through the portion of the paper immediately below the raised portions of the screen. The use of a screen, however, has been found not to be limited to recorders employing electrosensitive paper but superior results are obtained in recorders of the type wherein the marking means includes carbon paper or ribbon which is pressed by means of a stamp or stylus against recording paper backed up by a platen which is reticulated or overlaid by a screen. A reticulated platen also gives more distinct carbon copies when used with a manual stylus such as a pencil or ballpoint pen due, it is presently believed, to the concentration of unit pressure on the carbon paper by the raised portions of the platen.

I claim:

1. An auxiliary marking device for use with a recorder of the type wherein a rotating helical electrode and a blade electrode are disposed upon the opposite sides of a traveling web of electrosensitive recording paper to cause the effective recording point to move transversely thereof, comprising two auxiliary recording elements located respectively on either side of the paper, the portion of one of the elements adjacent the paper bearing an indicia, means for causing the flow of an electrical current, a first of whose terminals is connected to the recording element located upon the same side of the web as the recording blade, an auxiliary electrode connected to the other of the terminals and positioned upon the opposite side of the paper from the element to which the first terminal is connected, the other element being electrically interconnected with the blade electrode, and means for relatively moving the elements to bring the paper into contact with the indicia thereby to record an image of the indicia upon the paper simultaneously with the recording of a fiducial line by the helical and blade electrodes.

2. A device according to claim 1 wherein the effective portion of the element not bearing the indicia is reticulated.

3. For use with a recorder of the type wherein a rotating helical electrode and a blade electrode are disposed upon opposite sides of a traveling web of paper to cause the effective recording point to move transversely of the web, an auxiliary marking device comprising an anvil having raised indicia located adjacent the same side of the paper as said helical electrode and electrically interconnected with said blade electrode, a hammer located adjacent the opposed side of said paper from said anvil, means for causing the flow of an electrical current one of whose terminals is connected to said hammer, an auxiliary electrode located upon the opposite side of the paper from said hammer and connected with the other terminal of said means, and further means for moving the hammer towards said anvil thereby to record an image of the indicia upon the paper simultaneously with the recording of a fiducial line by the helical and blade electrodes.

4. For use with a recorder of the type wherein a rotating helical electrode and a blade electrode are disposed upon opposite sides of a traveling web of paper to cause the effective recording point to move transversely of the web, an auxiliary marking device comprising an anvil having raised indicia located adjacent the same side of the paper as said helical electrode and electrically interconnected with said blade electrode, a hammer having a reticulated portion located adjacent the opposed side of said paper from said anvil, means for causing the flow of an electrical current one of whose terminals is connected to said hammer, an auxiliary electrode located upon the opposite side of the paper from said hammer and connected with the other terminals of said means, and further means for moving the hammer towards said anvil thereby to record an image of the indicia upon the paper simultaneously with the recording of a fiducial line by the helical and blade electrodes.

5. For use with a recorder of the type wherein a rotating helical electrode and a blade electrode are disposed upon opposite sides of a traveling web of paper to cause the effective recording point to move transversely of the web, an auxiliary marking device comprising an anvil having raised indicia located adjacent the same side of the paper as said helical electrode and electrically interconnected with said blade electrode, a hammer located adjacent the opposed side of said paper from said anvil, a screen attached to the face of the hammer opposed to the surface of the paper thereby to form a reticulated effective portion, means for causing the flow of an electrical current one of whose terminals is connected to said hammer, an auxiliary electrode located upon the opposite side of the paper from said hammer and connected with the other terminal of said means, and further means for moving the hammer towards said anvil thereby to record an image of the indicia upon the paper simultaneously with the recording of a fiducial line by the helical and blade electrodes.

6. For use with a recorder of the type wherein a rotating helical electrode and a blade electrode are disposed upon opposite sides of a traveling web of paper to cause the effective recording point to move transversely of the web, an auxiliary marking device comprising an anvil having raised indicia located adjacent the same side of the paper as said helical electrode and electrically interconnected with said blade electrode, a hammer located adjacent the opposed side of said paper from said anvil, a source of electrical energy including a capacitor one of whose terminals is connected to said hammer, an auxiliary electrode located upon the opposite side of the paper from said hammer and connected with the other terminal of said capacitor, and means for moving the hammer towards said anvil thereby to record an image of the indicia upon the paper simultaneously with the recording of a fiducial line by the helical and blade electrode.

7. For use with a recorder of the type wherein a rotating helical electrode and a blade electrode are disposed upon opposite sides of a traveling web of paper to cause the effective recording point to move transversely of the web, an auxiliary marking device comprising an anvil having raised isochronal indicia located adjacent the same side of the paper as said helical electrode and electrically interconnected with said blade electrode, means for chronologically changing the anvil indicia, a hammer located adjacent the opposed side of said paper from said anvil, means for causing the flow of an electrical current one of whose terminals is connected to said hammer, an auxiliary electrode located upon the opposite side of the paper from said hammer and connected with the other terminal of said means, and further means for moving the hammer towards said anvil thereby to record an image of the indicia upon the paper simultaneously with the recording of a fiducial line by the helical and blade electrodes.

8. For use with a recorder of the type wherein a rotating helical electrode and a blade electrode are disposed upon opposite sides of a traveling web of paper to cause the effective recording point to move transversely of the web, an auxiliary marking device comprising an anvil having raised indicia located adjacent the same side of the paper as said helical electrode and electrically interconnected with said blade electrode, a hammer located adjacent the opposed side of said paper from said anvil, means for causing the flow of an electrical current one of whose terminals is connected to said hammer, an auxiliary electrode located upon the opposite side of the paper from said hammer and connected with the other terminal of said means, an electric solenoid for actuating the hammer to move the hammer towards said anvil, and an electric circuit including a cam operated switch for periodically energizing the solenoid and correspondingly operating the hammer thereby to record an image of the indicia upon the paper simultaneously with the recording of a fiducial line by the helical and blade electrodes.

9. An auxiliary marking device for use with a recorder of the type employing electrosensitive paper comprising two electrodes having opposed effective planar portions which are disposed respectively adjacent opposite sides of the paper, the effective planar portions of one of the electrodes being raised electrically conducting indicia, the effective planar portion of the other electrode being a raised screen whose reticulated strands are electrically interconnected, an electric circuit connecting with the electrodes to impress a uniform potential difference between the indicia and the screen strands, and means for relatively linearly moving substantially the entire recording areas of the respective effective planar portions of the electrodes into forcible contact with the paper and normal thereto thereby to record an image of the indicia upon the paper.

References Cited in the file of this patent

UNITED STATES PATENTS

| | | |
|---|---|---|
| 133,567 | Corry | Dec. 3, 1872 |
| 625,914 | Zuccato | May 30, 1899 |
| 1,088,129 | Cone | Feb. 29, 1914 |
| 1,130,020 | Ramsey | Mar. 2, 1915 |
| 1,332,632 | Paddock | Mar. 2, 1920 |
| 1,549,784 | Middleton | Aug. 18, 1925 |
| 1,558,536 | Delany | Oct. 27, 1925 |
| 1,865,610 | Blair | July 5, 1932 |
| 2,248,522 | Conrad | July 8, 1941 |